United States Patent

Wartian

[11] 3,928,889
[45] Dec. 30, 1975

[54] COMBINATION BRACKET AND ELASTOMERIC ELEMENT THEREFOR
[75] Inventor: George Wartian, East Detroit, Mich.
[73] Assignee: Wartian Lock Company, St. Clair Shores, Mich.
[22] Filed: Jan. 6, 1975
[21] Appl. No.: 538,765

[52] U.S. Cl................ 16/74; 24/129 R; 403/209
[51] Int. Cl.² ............................................ E05F 1/08
[58] Field of Search.............. 16/74, 71, 72, 86 R; 24/129 R, 129 B, 130, 73 A; 403/209

[56] References Cited
UNITED STATES PATENTS
87,867  3/1869  Morse................................... 16/74
3,517,408  6/1970  Banse................................... 16/72

*Primary Examiner*—Andrew V. Kundrat
*Attorney, Agent, or Firm*—Whittemore, Hulbert & Belknap

[57] ABSTRACT

A bracket is provided for frictional connection to an elongated elastomeric element, such as a length of rubber having a circular cross section. The bracket has three openings, a first inlet opening, an outlet opening and a second inlet opening which together define a sinuous path through which the elastomeric element is inserted. This arrangement results in the elastomeric element being frictionally retained by the bracket without use of fasteners, knots or the like.

3 Claims, 6 Drawing Figures

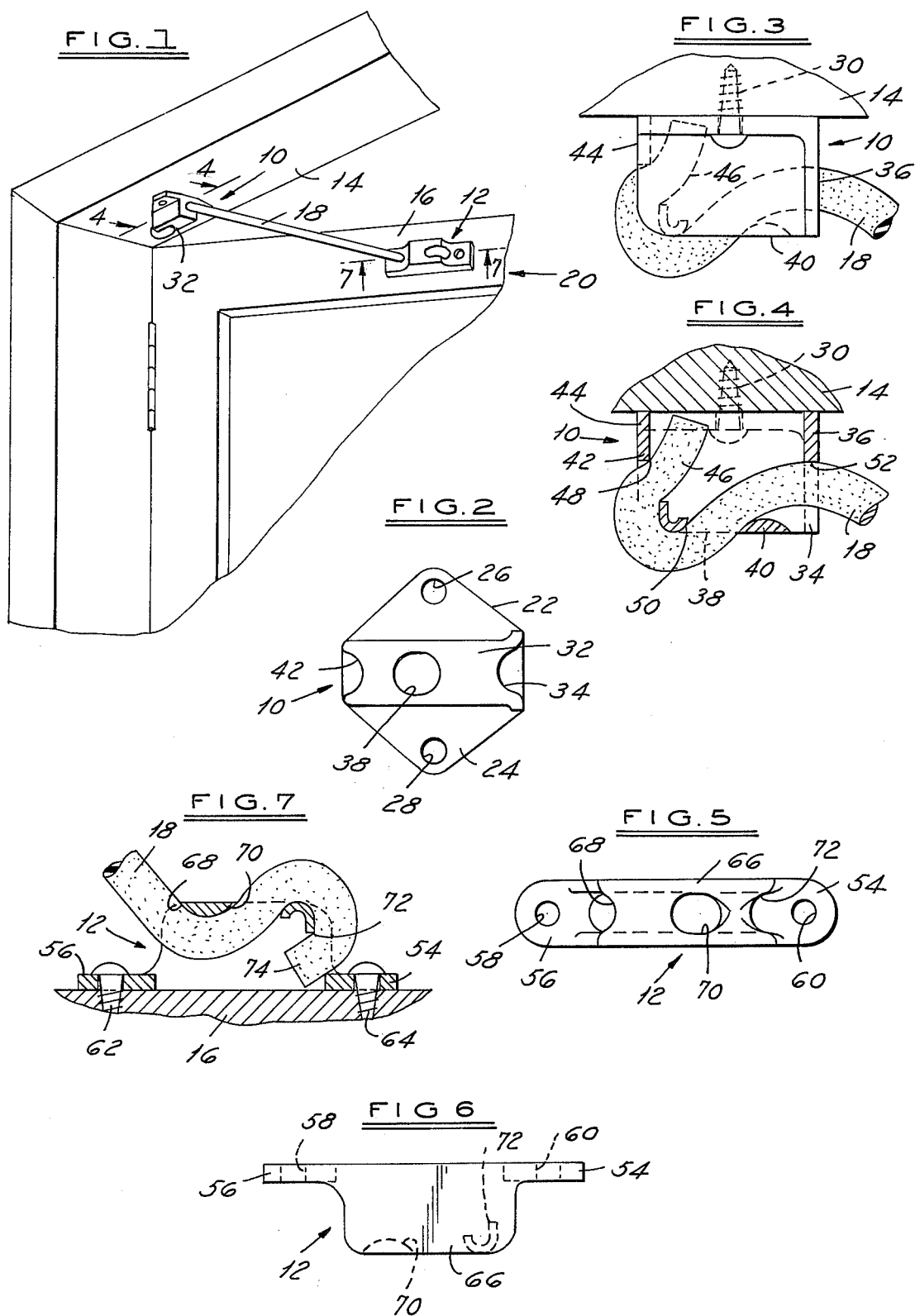

COMBINATION BRACKET AND ELASTOMERIC ELEMENT THEREFOR

BACKGROUND OF THE INVENTION

In the past, numerous different styles of brackets and elongated elements connected thereto have been provided for various uses. For example, the storm doors of most houses open outwardly. A bracket and chain structure is commonly mounted between the top jamb of the door opening and the upper edge of the door to limit the extent to which the door may be opened. This is a protective device to prevent damage to the door in the event that the door is opened and gets caught in a heavy wind which forces the door rapidly to a fully open position. Such an action can tear the door off its hinges or damage the usual door closer which is provided on such doors to automatically close the door after it has been opened.

The present invention provides a unique combination of bracket and elongated elastomeric element to serve in the same capacity as such previous chain and bracket combinations. The elastomeric element is connected to the bracket merely by inserting one end into the bracket which has a sinuous passageway therethrough to engage the elastomeric element. This construction permits quick connecting and disconnecting of the elastomeric element without resort to fastening means, knots or other types of conventional means for making a connection. Further, the use of an elastomeric element in, for example, the door limiting device, prevents the severe jolt which normally occurs when the door is opened as far as it can be when a rigid chain is used.

There are numerous other applications for the combination of the present invention. The combination may be used in any environment where it is desired to quickly connect an elongated elastomeric element to a bracket. The invention also has the obvious advantage of permitting rapid disconnecting of the elements when desired. The structure is easily manufactured, simple to install and durable in operation.

SUMMARY OF THE INVENTION

The combination of a bracket and elastomeric element therefor includes a bracket which comprises a body having at least three walls. A first entrance opening is provided in one of the walls. An exit opening is provided in a second wall adjacent said one wall. The second entrance opening is provided in the third wall. The first entrance opening is in communication with the exit opening interiorally of the body. One end of the elastomeric element is inserted first into the first entrance opening, thence out of said exit opening and thence into the second entrance opening whereby the end of elastomeric element received in the bracket is configured in a hook-shape which is resistant to extraction from the bracket when the portion of the elastomeric element exteriorally of the bracket is pulled upon.

IN THE DRAWING

FIG. 1 is a view in perspective of a pair of brackets and an elongated element connected therebetween mounted illustratively on a door structure to serve as a means for limiting the extent to which the door may be opened;

FIG. 2 is a plan view of the bracket mounted on the top jamb of the door opening of FIG. 1;

FIG. 3 is a side elevational view of the bracket of FIG. 2 illustrating one end of the elongated element inserted therein;

FIG. 4 is a sectional view taken substantially along the line 4—4 of FIG. 1 looking in the direction of the arrows;

FIG. 5 is a plan view of the bracket mounted on the door of FIG. 1;

FIG. 6 is a side elevational view of the bracket of FIG. 5; and

FIG. 7 is a sectional view taken substantially along the line 7—7 of FIG. 1.

Referring to FIG. 1, it will be noted that a pair of brackets 10, 12 are mounted, respectively, on the top jamb 14 of the door opening and the upper edge 16 of the door. An elongated elastomeric element 18 is connected between the brackets 10, 12. The door 20 is illustrated in a partially open position. In this position, the element 18 has been stretched to a relatively taut condition. The door may be opened further because the element 18 will stretch. However, element 18 is not adapted to easily stretch as would be the case, for example, with the ordinary door coil spring. Element 18 resists stretching and the reactive forces applied by the element 18 to the door will prevent extensive additional opening of the door as a result, for example, of a wind force. The elastomeric nature of the element 18 is primarily to prevent a severe jolt when the door has been opened to the maximum extension desired.

The brackets 10, 12 are essentially of the same construction excepting for the physical configuration thereof which is adapted to the particular locations wherein the brackets are mounted. The bracket 10 is illustrated in FIGS. 2, 3 and 4. As will be noted, the bracket comprises a pair of outwardly extending flanges 22, 24 having openings 26, 28 therein for the reception of screws 30 to secure the bracket 10 to the top jamb 14. A central raised portion 32 is provided between the flanges 22, 24. The interior of portion 32 is essentially hollow. A first inlet opening 34 is provided in one wall 36, an exit opening 38 is provided in the lower wall 40 and a second entrance opening 42 is provided in the wall 44 which is opposite from the wall 36.

The elongated element 18 is, as illustrated, a length of rubber having a circular cross section. The end 46 is first projected through the first inlet opening 34. The end 46 is then projected through the exit opening 38. The end 46 is then flexed upwardly and forced through the second entrance opening 42.

As will be noted in FIGS. 3 and 4, when the elastomeric element 18 has been inserted into the bracket 10 as above described, it has been trained in a sinuous configuration which prevents extraction of the element 18 from the bracket 10 as a consequence of pulling on the portion of the element 18 which is outside of the bracket 10. This result emanates from several factors. Firstly, as a consequence of being elastomeric material, the element 18 has a relatively high coefficient of friction thereby tending to frictionally engage the various surfaces of the bracket 10 which it touches. This inhibits withdrawal of the element 18 from the bracket. Next, being elastomeric, the element 18 tends to stretch when it is pulled. This tends to prevent application of the pulling force along the entire length of the element as would be the case, for example, with an inelastic element.

But most importantly, withdrawal of the element 18 from the bracket 10 is prevented by the configuration of the element 18 as determined by the various openings through which it projects in the bracket. As it will be noted, portion of element 18 within bracket 10 assumes what may be termed a generally hook-shape. Of most significance in this hook-shape with respect to preventing withdrawal of element 18 from bracket 10 is the portion between points 48, 50. The portion between points 50, 52 is of importance in reversing the direction of the element 18 thereby preventing any possibility of a force being exerted on the portion between points 48, 50 which could tend to pull the element 18 out of the bracket 10.

The bracket 12, as previously mentioned, has essentially the same configuration as the bracket 10 but a different physical appearance so that it will fit the relatively narrow edge 16 of the door 20. The bracket 12 has end flanges 54, 56 with openings 58, 60 therein for the reception of screws 62, 64 to fasten the bracket 12 to the edge 16. A central raised portion 66 is provided with a first inlet opening 68, an exit opening 70 and a second inlet opening 72 to receive the end 74 of the element 18 as described in connection with the bracket 10.

What I claim as my invention is:

1. The combination of a bracket and elastomeric element therefor, said bracket comprising a body having at least three walls, a first entrance opening in one of the walls, an exit opening in a second wall adjacent said one wall, a second entrance opening in the third wall, said first entrance opening being in communication interiorally of said body with said exit opening, one end of said elastomeric element being inserted first into said first entrance opening, thence out of said exit opening and thence into said second entrance opening whereby said one end of the elastomeric element is configured in a hook shape which is resistant to extraction from the bracket when the portion of the elastomeric element exteriorally of the bracket is pulled upon.

2. The combination as defined in claim 1, further characterized in that said first and second entrance openings lie in substantially parallel spaced apart planes, said exit opening lying in a plane which is normal to the planes of said first and second entrance openings.

3. The combination as defined in claim 1, further characterized in that the portion of said one end of said elastomeric element which extends from said exit opening and into said second entrance opening defines a hook shape, the portion of said one end of said elastomeric element which extends from said first entrance opening to said exit opening being turned back with respect to the hook-shaped portion whereby the portion of the elastomeric element exterially of the bracket cannot be pulled in a direction to easily extract the hook-shaped portion from the bracket.

* * * * *